(No Model.)
D. W. MAGEE.
APPARATUS FOR HEATING RAILWAY CARS.
No. 584,288. Patented June 8, 1897.
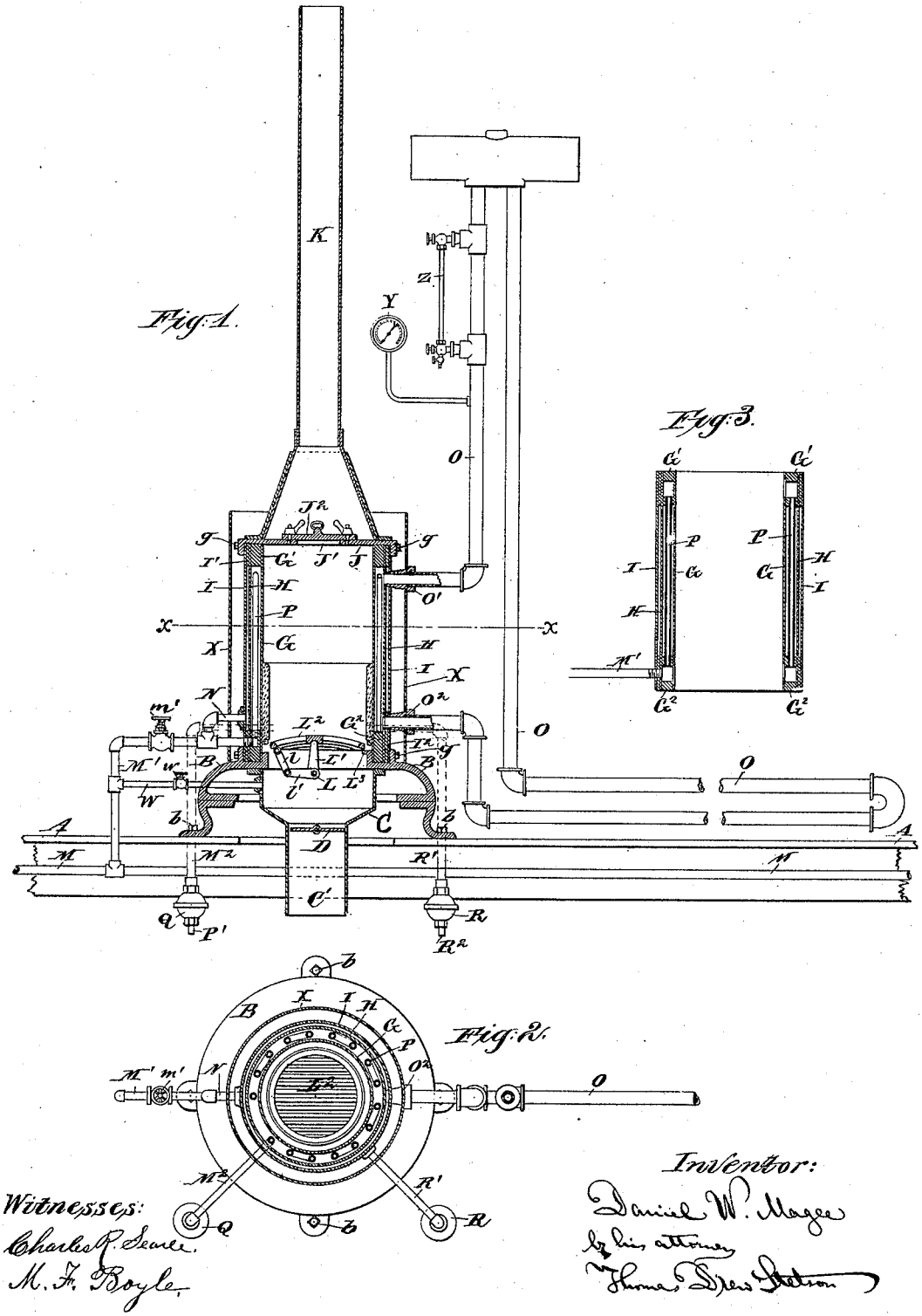

United States Patent Office.

DANIEL W. MAGEE, OF NEW YORK, N. Y., ASSIGNOR TO THE SAFETY CAR HEATING AND LIGHTING COMPANY, OF NEW JERSEY.

APPARATUS FOR HEATING RAILWAY-CARS.

SPECIFICATION forming part of Letters Patent No. 584,288, dated June 8, 1897.

Application filed December 15, 1887. Serial No. 257,910. (No model.)

*To all whom it may concern:*

Be it known that I, DANIEL W. MAGEE, of the city and county of New York, in the State of New York, have invented a certain new and useful Improvement in Apparatus for Heating Railway-Cars, of which the following is a specification.

The accompanying drawings form a part of this specification and represent what I consider the best means of carrying out the invention.

Figure 1 is a central vertical section through the heater, with an elevation of the principal connected parts. Fig. 2 is a horizontal section on the line $x\ x$ in Fig. 1. Fig. 3 shows a modification.

Similar letters of reference indicate corresponding parts in all the figures where they occur.

A is the floor of a car.

B is a foundation-casting with strong legs and secured upon the floor by efficient fastenings $b$.

C is a chamber adapted to receive the fire when the grate is dumped, and D is a turning valve which controls the discharge of the material through a liberal passage $C'$, leading down through the floor.

G is a cylindrical casing which constitutes the fire-chamber. Its lower portion may be lined with soapstone, fire-brick, or other non-conductor, but its upper portion is preferably left uncovered to allow the fire inside to communicate its heat as rapidly as may be to the water outside.

H is a cylindrical casing exterior to casing G and strongly connected through the rings $G'\ G^2$. Exterior to casing H is another pair of rings $I'\ I^2$ of less thickness. Exterior to these is another cylindrical casing I. The casings G, H, and I are strongly and tightly united by rivets $g$.

O is a system of pipes, sometimes called the "Baker" system, which traverses the car and allows the circulation of the water to communicate the heat throughout the structure. It may be arranged in the ordinary and long-approved manner. The ends connect, through couplings $O'\ O^2$, with the extended annular water-chamber between the casings G and H.

M is an iron pipe extending longitudinally of the car and connected with the other cars of the train and with the locomotive by suitable flexible connections. (Not shown.)

$M'$ is a branch controlled by a valve $m'$ and communicating through an aperture in the lower ring $G^2$ with a system of pipes P, which traverses the space between the casings G and H and terminates in a pipe $M^2$, which leads outward and downward to a trap Q, and thence discharges through a pipe $P'$. Thus the system of pipes P is kept filled with live steam, which imparts its heat efficiently to the water which surrounds it and fills all the remaining space between the casings G and H.

N is a branch pipe leading from the pipe $M'$ and communicating with the thin space between the casings H and I.

$R'$ is a pipe leading therefrom to a trap R and discharging any water which condenses in this space through the pipe $R^2$.

Whenever the valve $m'$ is opened to admit steam to the apparatus, the system of pipes P is filled with steam, presenting a great surface to heat the water, and the space between H and I is also filled with steam, which heats the whole exterior surface of the water-chamber, and unless otherwise provided will also throw out heat actively by radiation into the car from the exterior face of the casing I.

X is a light casing of sheet metal or other suitable material open at the top and bottom and held concentric to the casing I. It is at a sufficient distance therefrom to allow the air of the car to circulate actively within and through it. The air heated by contact with the hot casing I rises through this space, and this space is supplied by fresh air entering below. Passengers may sit as near the casing as they please without being incommoded.

A horizontal plate J matches on the upper part of the casing G H I, having an aperture $J'$, controlled by a valve $J^2$, which is adapted to permit the charging with fuel when required, allow the passage of the draft when the apparatus is working with fire in the interior, and retain the fire in case the car is overturned in any accident. Such valve may be in all respects similar to that set forth in the patent to W. S. Jones, dated July 15, 1873, No. 140,831. A hollow conical casing extends upward over this valve equipped for receiving fuel and for closing the passage when required. This may be as described in the patent to C. J. Smith, dated June 29, 1869, No. 92,115.

K is a smoke-pipe leading up through the roof of the car. (Not shown.)

A stout horizontal shaft L extends across the otherwise open base of the fire-chamber. It supports a post L', having a rounded top. On this top sits a rocking grate $L^2$, having a slightly-domed contour. One edge of this grate rests on a ledge $L^3$ at one side. To the other edge is connected a link $l$, connecting with an arm $l'$ from the shaft L, which extends across the chamber C, and may be rocked by a wrench or suitable lever applied to the squared extremity in the obvious manner. By rocking this shaft in one direction or the other the grate $L^2$ may be thrown into position to serve in supporting the fuel in the fire-chamber or may be tilted up to discharge the fuel into the chamber C below.

When it is desired to use my heater as a stove, the fuel which may have been previously introduced is ignited through the top by opening the casing X and valve $J^2$ or by other convenient means, and on readjusting the parts the apparatus serves usefully and efficiently, giving heat from its contained fire to the water, and thereby warming the car. When the car is connected in a train or when for any reason the fire is no longer required, the shaft L is tilted and the fire dumped from the grate $L^2$ into the chamber C, where it is supported by the valve D, which must be previously placed in the horizontal position shown. The grate $L^2$ is now returned to its horizontal position and the hot coal is retained in the chamber C, where it is allowed to receive no air until the fire is extinguished, after which it is dumped upon the track or into any suitable receptacle by turning the valve D. In order to hasten the extinguishment of the fire, I provide a pipe W, controlled by a valve $w$, which admits steam more or less mingled with water from the pipe M' and rapidly extinguishes the fire.

It will be understood that when my heater is used as a stove the valve D is turned into the upright position and the upper valve $J^2$ is open to allow air to move upward through the fire and support the combustion. If the fire is too hot, its vigor may be reduced by partially closing either or both of these valves. When it is used both as a stove and a steam-heater, these valves are open, or partly open, to allow the draft to support the fire in the interior, and the valve $m'$ is opened to admit the steam to aid in heating the water. When the apparatus is used as a steam-heater alone, either the valve D or the upper valve $J^2$ should be closed tightly to prevent cold air from moving up through the interior.

Y is a pressure-gage fitted on the ascending portion of the water-pipe to indicate pressure.

Z is a glass water-gage fitted at a higher point on the water-pipes P. It serves usefully to indicate the level to which the water sinks by contraction when it is allowed to cool. It aids to indicate to the attendant when more water should be added.

Modifications may be made without departing from the principle or sacrificing the advantages of the invention.

I have represented the system of pipes P as composed of a series of U-bends at the top and bottom, the steam flowing up one pipe and down the next; but this may be replaced by a hollow ring at the bottom and a hollow ring at the top with vertical pipe connections. Fig. 3 represents such a modification.

I claim as my invention—

In a railway-car heater, the three concentric casings G, H, I, in combination with the circulating water-pipes O communicating with the space between the casings G and H, and the system of internal heating-pipes P situated in the same space, steam-supplying pipes M M' communicating with the pipes P, the branch N extending from the pipe M' and communicating with the space between the casings H and I and valve $m'$ in the pipe M', and traps Q and R serving to drain the pipes P, the whole adapted to heat the water in the circulating-pipes, and also to radiate heat from the exterior of the heater, substantially as set forth.

In testimony whereof I have hereunto set my hand, at New York city, this 9th day of December, 1887, in the presence of two subscribing witnesses.

DANIEL W. MAGEE.

Witnesses:
M. F. BOYLE,
H. A. JOHNSTONE.